United States Patent
Barrenscheen et al.

(10) Patent No.: US 6,854,024 B2
(45) Date of Patent: Feb. 8, 2005

(54) IDENTIFICATION OF A PERIPHERAL CONNECTION STATE WITH A UNIVERSAL SERIAL BUS

(75) Inventors: Jens Barrenscheen, München (DE); Peter Schneider, Haar (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 10/377,815

(22) Filed: Feb. 28, 2003

(65) Prior Publication Data

US 2003/0158977 A1 Aug. 21, 2003

Related U.S. Application Data

(63) Continuation of application No. PCT/DE01/03072, filed on Aug. 9, 2001.

(30) Foreign Application Priority Data

Aug. 30, 2000 (DE) .......................................... 100 42 633

(51) Int. Cl.[7] .............................................. G06F 13/38
(52) U.S. Cl. .............................. 710/19; 710/15; 710/62; 710/72; 710/300
(58) Field of Search ............................. 710/15–19, 62, 710/72, 300–304, 305, 306, 313

(56) References Cited

U.S. PATENT DOCUMENTS

| 5,612,634 | A | | 3/1997 | MacKenna |
| 6,012,103 | A | | 1/2000 | Sartore et al. |
| 6,131,134 | A | * | 10/2000 | Huang et al. ................ 710/302 |
| 6,442,734 | B1 | * | 8/2002 | Hanson et al. ................. 716/4 |
| 6,601,124 | B1 | * | 7/2003 | Blair .......................... 710/305 |
| 6,625,790 | B1 | * | 9/2003 | Casebolt et al. ............... 716/8 |

FOREIGN PATENT DOCUMENTS

| DE | 198 19 567 A1 | 4/1999 |
| WO | WO 99/08422 | 2/1999 |
| WO | WO 00/34878 | 6/2000 |
| WO | WO 01/25943 A1 | 4/2001 |

* cited by examiner

Primary Examiner—Ilwoo Park
(74) Attorney, Agent, or Firm—Laurence A. Greenberg; Werner H. Stemer; Ralph E. Locher

(57) ABSTRACT

A circuit configuration for a USB peripheral has an integrated circuit, which has two pins for connecting to two data transmission lines of a USB connection. A peripheral functional information resistor, which is specified as being essential in accordance with USB, is connected to one of the pins. The other pin is connected to the operating voltage via an electrically conductive component. The integrated circuit has an evaluation device, which identifies the USB connection state in dependence on the potential that is present on the other pin.

9 Claims, 2 Drawing Sheets

IDENTIFICATION OF A PERIPHERAL CONNECTION STATE WITH A UNIVERSAL SERIAL BUS

CROSS-REFERENCE TO RELATED APPLICATION

This application is a continuation of copending International Application No. PCT/DE01/03072, filed Aug. 9, 2001, which designated the United States and was not published in English.

BACKGROUND OF THE INVENTION

Field of the Invention

The invention relates to a circuit configuration for a peripheral using a USB, an integrated circuit for a USB peripheral, as well as a method by which it is possible to determine whether the peripheral is or is not connected to a USB connection in an integrated circuit of a USB peripheral.

The universal serial bus, referred to as USB in the following text, is a serial bus for connecting different electronic appliances. Owing to its versatility, the USB has been used increasingly in data processing and communications systems in recent years.

The system architecture of the USB has three different elements, which are referred to as a host, a hub and a device.

The host is a central computer. The expression hub describes the distribution nodes of the USB. Peripherals such as telephones, computer mice, keyboards, printers, etc. which are connected to the USB are referred to as devices.

In the German-language literature, the three elements of the USB that have been mentioned are always referred to by their anglicized names and no generally applicable German-language terminology exists. The original German-language version of this patent therefore retains the terms host and hub but uses the German-language term "Peripheriegerät" [peripheral] for the element referred to as a "device" for USB.

International Patent Disclosure WO 00/34878 A1 describes a USB peripheral in which a resistor and a switch are connected between one of the data lines and the operating voltage potential. If the switch electrically connects the resistor to the operating voltage potential, the associated hub can determine whether it is connected to the peripheral. The switch is formed by a field-effect transistor.

A plug connection between a motherboard and a plug-in board is described in U.S. Pat. No. 5,612,634. The plug-in board has a circuit configuration that makes it possible, on the basis of a potential measurement, to determine whether there is an electrical connection between the motherboard and the plug-in board.

SUMMARY OF THE INVENTION

It is accordingly an object of the invention to provide a device and method for identifying a peripheral connection state to a USB that overcome the above-mentioned disadvantages of the prior art devices and methods of this general type. The invention is based on the object of specifying a circuit configuration for a USB peripheral that allows a low-cost implementation of the integrated circuit contained in the USB peripheral. A further aim is to provide a low-cost integrated circuit that is able to identify the connection state of the USB peripheral. Another aim of the invention is to specify a simple method, which involves little hardware complexity, for this purpose.

With the foregoing and other objects in view there is provided, in accordance with the invention, a circuit configuration for a universal serial bus (USB) peripheral. The circuit configuration contains an operating voltage terminal providing an operating voltage, and an integrated circuit having two pins, including a first pin and a second pin, for connecting to two data transmission lines of a USB connection. A peripheral functional information resistor is connected between the second pin and the operating voltage terminal, the peripheral functional information resistor being present as an essential feature as specified in accordance with USB specifications. An electrically conductive component is connectable between the first pin and the operating voltage terminal. Upon connection of the electrically conductive component to the first pin, an electrical potential impressed on the first pin is dependent on whether or not the USB connection is connected to the USB peripheral. The integrated circuit has an evaluation device coupled to the first pin for identifying a USB connection state in dependence on the electrical potential present on the first pin.

One major aspect of the invention is that a pin that is intended for data transmission on the integrated circuit is used for identification of the connection state.

In this case, the pin that is actually used is that which is not connected to the peripheral functional information resistor that must be present in accordance with the USB specification. According to the invention—at least when it is intended to check the connection state of the USB peripheral—the pin is connected to the operating voltage via an electrically conductive component. The component results in the electrical potential which is present on the other pin being dependent on whether or not there is a USB connection to the USB peripheral. If no connection exists, the pin is at the operating voltage potential because of the electrically conductive potential. If a connection does exist, then the potential that occurs corresponds to the terminating impedance, which is governed by the hub, and the resistance of the electrically conductive component. This in turn makes it possible for the integrated circuit to identify the USB connection state (presence or absence of a connection) on the basis of the potential that is present on the other pin. The invention thus has the advantage that there is no need for a special pin to identify the connection state of an integrated circuit.

It should be mentioned that, in order to correctly evaluate the connection state in the integrated circuit, there is no need to know which of the two pins is connected to the peripheral functional resistor and which is connected to the electrically conductive component. This is because, if the USB peripheral is not connected to the hub, both pins are necessarily at the operating voltage potential while, in the other situation, at least one of the pins (namely that which is connected to the electrically conductive component) is at a different potential. Thus, the evaluation is preferably carried out in such a way that the evaluation device checks whether both pins are or are not at the operating voltage potential.

The electrically conductive components according to one advantageous refinement of the invention may be a nonreactive resistor or a transistor.

If the electrically conductive component is permanently connected to the first pin, it is preferable for it to have an electrical resistance that is greater than or equal to 100 kΩ. The greater the electrical resistance, the lower is the power loss produced in the component.

A further advantageous refinement of the invention relates to the situation where the circuit configuration has a changeover switch using which the peripheral functional information resistor is disconnected to the one pin and is in this case connected to the other pin. A changeover switch such as this may, for example, be contained in the USB peripheral if the peripheral is a multifunction appliance or can operate in different operating modes. In this case, one advantageous development of the invention is characterized in that the one pin, which was originally connected to the functional information resistor, can also be connected via an electrically conductive component to the operating voltage. This results in that, when it becomes necessary to switch the peripheral functional information resistor, the capability according to the invention to identify the connection state is not lost, but is now handled via the first pin.

In principle, the electrically conductive component may be provided both in the integrated circuit and in the form of external circuitry for the integrated circuit. Particularly when the peripheral functional information resistor is embodied in the integrated circuit, the electrically conductive component is preferably also an integral component of the integrated circuit.

In the method according to the invention, the USB connection state is determined by evaluating the potential that is present on the second pin in the integrated circuit. As already described, this makes it possible to save the DA pin that is used in the prior art.

Other features which are considered as characteristic for the invention are set forth in the appended claims.

Although the invention is illustrated and described herein as embodied in a device and a method for identifying a peripheral connection state with a USB, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 2:
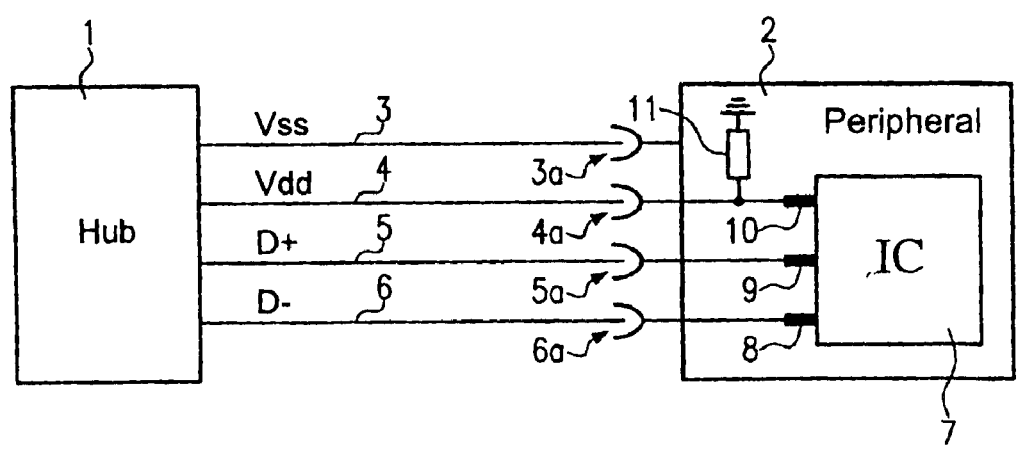
FIG. 2 is a block circuit diagram of a circuit configuration for identifying a peripheral connection state according to the prior art.

Referring now to the figures of the drawing in detail and first, particularly, to FIG. 2 thereof, there is shown a hub 1 connected to a peripheral 2. FIG. 2 shows a connection between one hub 1 and one peripheral 2. According to the USB specification, a connection such as this has four, and only four connecting lines. Two of the four connecting lines 3, 4 are intended for supplying power to the peripheral 2, but need not be used, since the peripheral 2 may also have its own power supply. The power supply connecting line 3 is at ground potential (Vss), and the power supply connecting line 4 is at the operating voltage potential (Vdd). The two data lines 5, 6 are denoted D+ and D− and, in operation, are at voltage levels which are related to the ground potential Vss, and are associated with the logical values 0 and 1.

The peripheral 2 has an integrated circuit 7 (chip) which can be connected to the data lines 6 and 5 via a respective first pin 8 and a second pin 9. The integrated circuit 7 normally contains a non-illustrated USB interface to which the data signals received via the pins 8 and 9 are supplied. Since the voltage values on the two data lines 5, 6 are referred to the ground potential Vss, the integrated circuit IC is in many implementations also supplied with the ground potential Vss, in a manner which is not shown (via a pin which is not shown).

Peripherals are frequently not permanently connected to the hub 1, but are connected to it only from time to time, as required. For this purpose, the USB peripheral 2 has plug contacts 3a, 4a, 5a, 6a, which are associated with the corresponding lines 3, 4, 5 and 6. At least if the integrated circuit 7 contains the USB interface, it must be able to identify whether or not the peripheral 2 is connected to the hub 1 via a USB connecting cable or the like.

In one known solution (see FIG. 2) the power supply connecting line 4 is used for this purpose. The integrated circuit 7 has a third pin 10, which is used to signal to the integrated circuit 7 whether or not there is a connection to the hub 1. The pin 10 is thus also referred to as a device attached (DA) pin. The third pin 10 can be connected to the power supply connecting line 4 (Vdd), and a high-value resistor 11, which is accommodated in the peripheral 2, produces a connection between the third pin 10 and ground.

If the hub 1 is not connected to the peripheral 2, then the electrical potential which is present on the third pin 10 is drawn via the high-value resistor 11 to ground, that is to say to Vss. This corresponds to the logic state 0. If this is not the case, that is to say when the peripheral 2 is connected to the hub 1, the operating voltage potential Vdd is present at the third pin 10, and this corresponds to the logic state 1. In consequence, it is possible by measuring the voltage that is present on the third pin 10 on the integrated circuit 7 to determine whether or not there is a connection between the peripheral 2 and the hub 1.

The known solution has the disadvantage that the integrated circuit 7 itself requires the pin 10 in order to determine whether or not the hub 1 is connected. Pins cost money and require space, which is normally very limited, for example in portable appliances or appliances with a small physical size.

Figure 1:
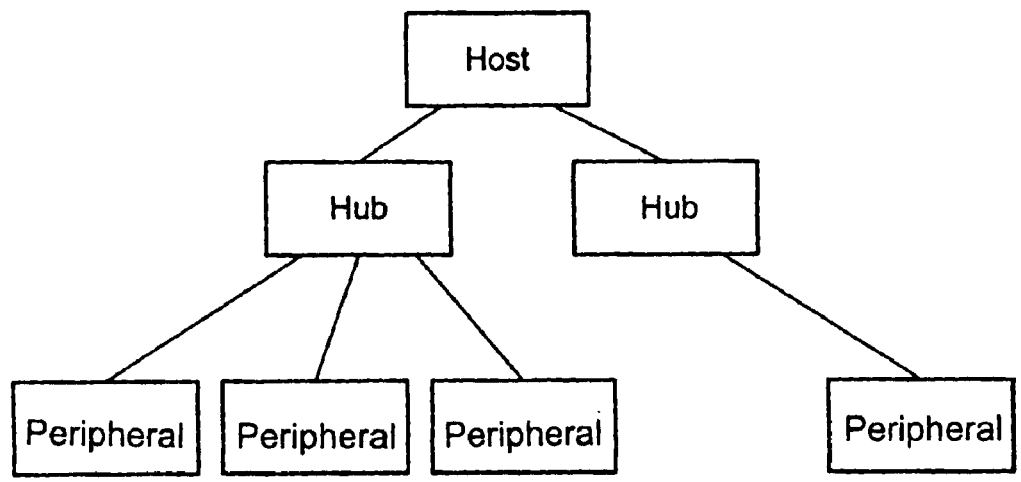
FIG. 1 is a block diagram of a USB system architecture.

FIG. 1 shows the system architecture of the USB. A central unit of the USB is the host, formed by a computer. One or more hubs 1 (distribution nodes) are connected to the computer. Each hub has a so-called upstream port in the host direction (or in the direction of the next-higher hub) and a number of downstream ports. USB peripherals or next-lower hubs can be connected to the downstream ports.

Figure 3:
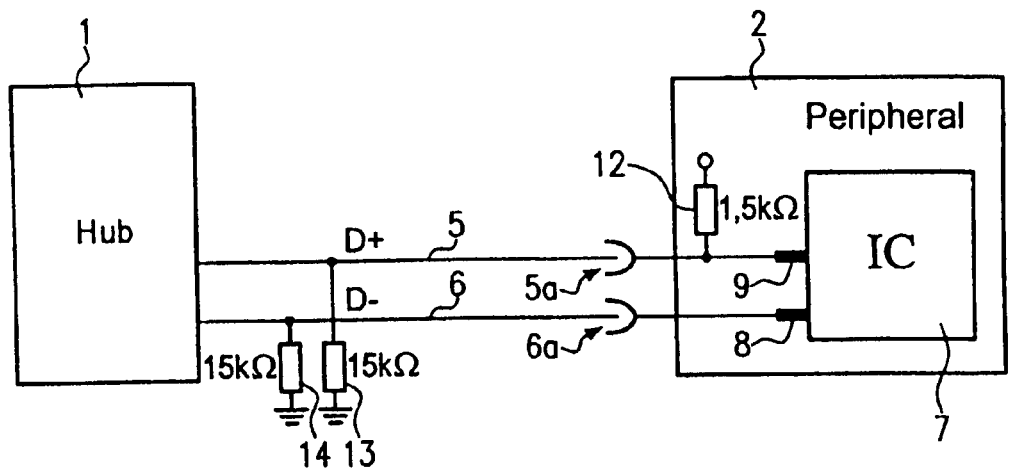
FIG. 3 is a block diagram of circuitry required in accordance with the USB specification for two data lines.

FIG. 3 shows the hub 1, which is connected to the peripheral 2 via a USB connection. The same reference symbols are used for the same or equivalent parts as in FIG. 2. FIG. 3 shows only the data lines 5, 6 (that is to say D+, D−). The following circuitry is specified for the data lines 5, 6 in accordance with the USB specification.

At the hub end, each of the data lines 5, 6 must be connected to ground via a 15 kΩ resistor 13, 14; at the peripheral 2 end, one of the pins 8, 9 (in this case: pin 9) must be connected to the operating voltage (normally +3, 3 V) by a 1.5 kΩ resistor 12.

The 1.5 kΩ resistor 12 is referred to as the peripheral functional information resistor. The USB specification specifies it as being essential for the resistor 12 to be connected to one of the two pins 8, 9. The resistor 12 is used to signal to the hub 1 that the USB peripheral 2 is connected, and specific capabilities of the USB peripheral 2 can be identified for the hub 1, depending on whether the resistor 12 is connected to the pin 8 or the pin 9.

Figure 4:
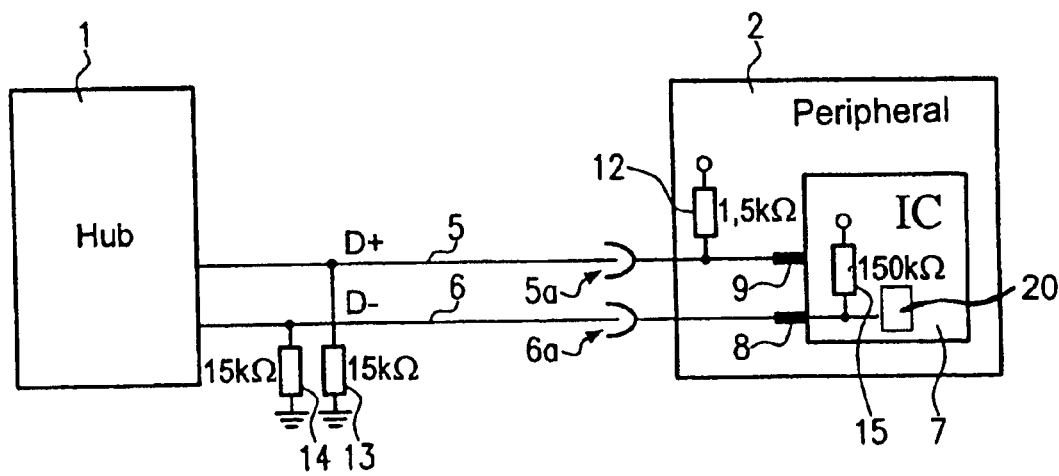
FIG. 4 is a block diagram of a circuit configuration according to the invention.

FIG. 4 illustrates a circuit configuration according to the invention. Once again, only the data lines 5, 6 are illustrated, and identical or functionally similar components are denoted by the same reference symbols as in FIGS. 2 and 3.

In the example illustrated in FIG. 4, the 1.5 kΩ peripheral functional information resistor 12 is connected to the pin 9 of the integrated circuit 7. The electrically conductive component, in this case formed by a 150 kΩ resistor 15, is provided in the integrated circuit 7 and permanently connects the pin 8 to the operating voltage. The rest of the circuit configuration corresponds to that illustrated in FIG. 3.

The resistor 15 operates as now described.

If the peripheral 2 is disconnected from the hub 1 (that is to say the plug contacts 5a and 6a are open), the resistor 15 results in the pin 8 being "drawn up" to the operating voltage potential. In the opposite situation, that is to say when the plug contacts 5a and 6a are closed, the pin 8 is connected to ground (Vss) via the data line 6 and via the 15 kΩ resistor 14. The electrical potential on the pin 8 is "drawn down" virtually to ground potential, since most of the voltage is now dropped across the resistor 15, whose value is considerably greater than that of the resistor 14.

The USB connection state can be determined in the integrated circuit 7 by evaluation of the potential that is present on the pin 8. The evaluation can be carried out, for example, on initialization of the peripheral 2 or at any other suitable time, and is assisted by calling up and processing an evaluation routine that is stored in an evaluation device 20 of the integrated circuit 7.

Various modifications are possible to the circuit configuration illustrated in FIG. 4.

In the configuration illustrated in FIG. 4, the 150 kΩ resistor 15 is permanently connected to the pin 8 and to the operating voltage. Another option is for the resistor 15 to be connected only temporarily to the pin 8, to be precise whenever it is intended to carry out a check of the connection state of the integrated circuit 7. In this case, the resistor 15 may also have smaller values (if it had a value of 15 kΩ, the potential on the data line 6 when a connection exits would be reduced to just half the operating voltage level).

The resistor 15 may be connected via a switching transistor or may itself be in the form of an emitter-collector path, for example in a poorly conductive p-transistor.

Both the functional information resistor 12 and the electrically conductive component 15 may be in the form of internal circuit components of the integrated circuit 7, in the form of external circuitry for the integrated circuit 7, or, as illustrated in FIG. 4, in mixed form.

Provided that the peripheral 2 and the integrated circuit 7 have the function of a component having a changeover switch, by which the 1.5 kΩ functional information resistor 12 can be connected either to the pin 9 or to the pin 8 at different times, and the resistor corresponding to the resistor 15 may also be connected to the pin 9. This resistor may likewise either be connected permanently, may be connectable and/or may be in the form of a transistor. As already mentioned, the integrated circuit 7 does not need to know the specific configuration of the resistor circuitry with the resistors 12, 15, since it can determine the connection state in any case by evaluation of the two pin potentials.

The USB connection 3, 4, 5, 6 may be in the form of a 4-core connecting cable or else may be implemented in some other way, for example via a radio link. In the latter case, the peripheral 2 has further devices such as an antenna, a modulator or a demodulator, etc. in a manner that is not illustrated.

We claim:

1. A circuit configuration for a universal serial bus (USB) peripheral, the circuit configuration comprising:

an operating voltage terminal providing an operating voltage;

an integrated circuit having two pins, including a first pin and a second pin, for connecting to two data transmission lines of a USB connection;

a peripheral functional information resistor connected between said second pin and said operating voltage terminal, said peripheral functional information resistor being present as an essential feature as specified in accordance with USB specifications;

an electrically conductive component connected or connectable between said first pin and said operating voltage terminal, upon connection of said electrically conductive component to said first pin, an electrical potential impressed on said first pin being dependent on whether or not the USE connection is connected to the USB peripheral; and a changeover switch connected between said first pin, said second pin, said peripheral functional information resistor and said electrically conductive component, using said changeover switch said peripheral functional information resistor can be disconnected from said second pin and connected to said first pin, and using said changeover switch said electrically conductive component can be disconnected from said first pin and connected to said second pin;

said integrated circuit having an evaluation device coupled to said first pin for identifying a USB connection state in dependence on the electrical potential present on said first pin.

2. The circuit configuration according to claim 1, wherein said evaluation device checks whether both of said pins are or are not at the operating voltage.

3. The circuit configuration according to claim 1, wherein said electrically conductive component is a nonreactive resistor.

4. The circuit configuration according to claim 1, wherein said electrically conductive component is a transistor.

5. The circuit configuration according to claim 1, wherein said electrically conductive component is permanently connected to said first pin and has an electrical resistance greater than or equal to 100 kΩ.

6. The circuit configuration according to claim 1, wherein said electrically conductive component is disposed in said integrated circuit.

7. The circuit configuration according to claim 1, wherein said electrically conductive component is disposed outside said integrated circuit.

8. An integrated circuit for a USB peripheral, the integrated circuit comprising:

two pins, including a first pin and a second pin, for connecting to two data transmission lines of a USB connection, said second pin to be connected to an operating voltage through a peripheral functional information resistor of the USB peripheral, said peripheral functional information resistor being present as an essential feature as specified in accordance with USB specifications;

an evaluation device for identifying a USB connection state in dependence on an electrical potential present on said first pin, said evaluation device coupled to said first pin; and a changeover switch connected between said first pin, said second pin, said peripheral functional information resistor, and said evaluation device, using said changeover switch said second pin can be disconnected from the operating voltage and said first pin can be connected to the operating voltage through said peripheral functional information resistor, and using said changeover switch said evaluation device can be uncoupled from said first pin and coupled to said second pin for identifying the USB connection state in dependence on an electrical potential present on said second pin.

9. The integrated circuit according to claim 8, wherein said evaluation device checks whether both of said pins are or are not at the operating voltage.

* * * * *